(12) United States Patent
Tsuboi et al.

(10) Patent No.: US 7,093,836 B2
(45) Date of Patent: Aug. 22, 2006

(54) SEAL DEVICE

(75) Inventors: Hajime Tsuboi, Tokyo (JP); Hideki Maruyama, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 5 days.

(21) Appl. No.: 10/869,213

(22) Filed: Jun. 17, 2004

(65) Prior Publication Data

US 2004/0256808 A1 Dec. 23, 2004

(30) Foreign Application Priority Data

Jun. 17, 2003 (JP) .............................. 2003-171999

(51) Int. Cl.
  *F16J 15/34* (2006.01)
  *F16J 15/38* (2006.01)
  *F16J 15/00* (2006.01)
(52) U.S. Cl. ...................... 277/377; 277/380; 277/358; 277/399; 277/379
(58) Field of Classification Search ................ 277/358, 277/377, 378, 379, 389, 380, 399
See application file for complete search history.

(56) References Cited

U.S. PATENT DOCUMENTS

| 3,194,569 | A | * | 7/1965 | Utvitch | ........................ 277/380 |
| 3,279,804 | A | * | 10/1966 | Blair | .......................... 277/380 |
| 4,613,005 | A | * | 9/1986 | Olsson | ........................ 175/371 |
| 6,086,069 | A | | 7/2000 | Bedford | |

* cited by examiner

*Primary Examiner*—Alexander Grosz
(74) *Attorney, Agent, or Firm*—Arent Fox PLLC

(57) ABSTRACT

A seal device includes a first resilient seal ring having a first resilient seal portion and first and second seal portions; and a second resilient seal ring. The first resilient seal portion urges a first seal surface of the first seal ring against the second seal surface of the second seal ring. The second seal portion mates with the first retainer portion of the first seal ring, while the first seal portion is in a sealing relation with one component. The second resilient seal ring has a second resilient seal portion, and first and second seal portions. The second resilient seal portion urges a second seal surface of the second seal ring against the first seal surface of the first seal ring, while the second seal portion mates with the second retainer portion of the second seat ring.

10 Claims, 9 Drawing Sheets

US 7,093,836 B2

SEAL DEVICE

BACKGROUND OF THE INVENTION

1. Field of the Invention

The present invention relates to a seal device disposed between a pair of relatively rotating elements typically seen in the rollers of a crawler, track roller, reduction gear, hydraulic motor or the like. More particularly, the invention relates to a seal device in the reduction gear unit of automobiles or hydraulic motors of a variety of machinery, which provides an effective seal at the interface of relatively moving elements against a process fluid containing slurry or a high pressure process fluid.

2. Description of the Related Art

Primary related art of the present invention is found as a seal ring in U.S. Pat. No. 6,086,069. A similar type of seal ring as the one shown in U.S. Pat. No. 6,086,069 is illustrated, for example, in FIG. 8. The seal ring 101 in FIG. 8 is, for example, mounted to a crawler unit 100.

In FIG. 8, 120 represents a shaft. The shaft 120 is disposed within a through bore of a roller 125, and a ring seal 101 is disposed in the chamber formed between the shaft 120 and the roller 125. The ring seal 101 provides a seal by preventing dusty water or muddy fluid from entering.

In this ring seal 101, a primary resilient ring 102 has an annularly shaped body whose cross section is "J"-shaped and outer surface forms a curved concave face 105. One end face of the primary resilient ring 102 is defined as outer fitting face 102A while the other end face is defined as inner fitting face 102B. Likewise, a secondary resilient ring 103 has also an annularly shaped body whose cross section is "J"-shaped and outer surface forms a curved concave face 105. Therefore one end face of the secondary resilient ring 103 defines outer fitting face 103A while the other end face defines inner fitting face 103B.

Next a first seal ring 110 has an annularly shaped body whose cross section is "U"-shaped and its radially extending end face of the first seal ring 110 defines a seal face 110A. An annular groove of the seal ring 110 which is located on the other side of the seal face 110A defines a mount groove portion 110B. Likewise, a second seal ring 111 has an annularly shaped body whose cross section is also "U"-shaped and its radially extending end face of the second seal ring 111 defines a mating seal face 111A. An annular groove disposed on the other side of the seal face 111A then defines a mount groove portion 111B.

The first resilient ring 102 and the second resilient ring 103 thus constructed as well as the first seal ring 110 and the second seal ring 111 are all installed within the chamber formed between the shaft 120 and the roller 125, as depicted in FIG. 8. Therefore the first resilient ring 102 and the second resilient ring 103 retain curved concave surfaces 105, 105 relative to an ambient passage chamber 126. Also the first resilient ring 102 and the second resilient ring 103 possess curved convex surfaces relative to a lubricant-filled internal chamber 127. The first resilient ring 102 exerts a resiliently urging force such that the seal surface 110A of the first seal ring 110 is pressed against the second seal ring 103. The opposed seal surfaces 110A and 111A being pressed against each other provide an effective seal for the process fluid coming into the ambient passage chamber 126.

In addition a floating seal device 150 shown in FIG. 9 is the second prior art related to the current invention. This floating seal device 150 include a first seal ring 152 and a second seal ring 153 which are disposed around the shaft in axially symmetric a manner. A seal surface 152A of the first seal ring 152 and a seal surface 153A of the second seal ring 153 therein exhibit a seal-tight joint. Such a joint between the seal surface 152A of the first seal ring 152 and the seal surface 153A of the second seal ring 153 is achieved by the resiliently urging forces due to compressed rubber materials as shown by the elliptic cross sections used for a first O-ring 155 and a second O-ring 156. For that purpose, the first O-ring 155 and the second O-ring 156 are disposed, respectively, between a housing and the first seal ring 152 and the housing and the second seal ring 153 such that the elliptic cross section forms an angle to the radial direction.

A first seal face 155A of the first O-ring 155 and a first seal face 156A of the second O-ring 156 individually form a sealing contact with the housing while a second seal face 155B of the first O-ring 155 and a second seal face 156B of the second O-ring 156, respectively, make a sealing contact with the first seal ring 152 and the second seal ring 153. However, the degree of the sealing contact at the seal surfaces 152A and 153A urged by the first O-ring 155 and the second O-ring 156 relies on the reaction force of the compressed rubber materials. Therefore a choice of hardness in rubber materials may vary and it makes difficult to make an optimal decision of rubber materials.

This floating seal device 150 provides a seal for a process fluid containing slurry. It can also be applied to a fluid containing fine particles. The first O-ring 155 and the second O-ring 156 which are resiliently compressed and disposed in a symmetric manner, respectively, provide urging forces to the first seal ring 152 and the second seal ring 153 so that a sealing contact is made between the opposed seal surfaces 152A and 153A. Therefore the fact that the elastic reaction forces due to the rubber materials of the first O-ring 155 and the second O-ring 156 is the source of the sealing contact at the seal surfaces 152A and 153A will lead to an acceleration of abrasion of the seal surfaces 152A and 153A caused by large urging forces.

In addition if slurry particles or as such are trapped at the joint surface between the first O-ring 155 and the first seal ring 152 or the second O-ring 156 and the second seal ring 153, the fine particles of slurry remain in the interface and cause the first O-ring 155 and the second O-ring 156 to be worn because of the resilient nature of the first O-ring 155 and the second O-ring 156. Furthermore a constant compressive stress given to the first O-ring 155 and the second O-ring 156 causes a stress relaxation and permanent deformation, which will reduce the intended resilient urging forces.

In the first prior art when a pressure accumulated in the ambient passage chamber 126 is applied to the first resilient ring 102 and the second resilient ring 103 where the pressure is received by the respective curved concave surfaces 105, 105, this will cause the curved concave surfaces 105, 105 to be further bent toward the internal chamber 127 which in turn will lessen the contact force at the seal surfaces 110A and 111A.

Promotion of the stress relaxation of the rubber material in the first resilient ring 102 and the second resilient ring 103 will lead to an unwanted permanent deformation in them. At the same time as the respective inner fitting faces 102B, 103B of the first resilient ring 102 and the second resilient ring 103, respectively, undergo elastic deformation in such a manner to depart from the mount groove portions 110B, 111B, the seal capability of the inner fitting faces 102B, 103B will deteriorate. As a consequence, fine particles contained in the process fluid or sediment located to the side of the ambient passage chamber 126 are trapped between the gaps between the inner fitting faces 102B, 103B and the mount groove portions 110B, 111B, respectively, which cause an abrasion of the inner fitting faces 102B, 103B and a decrease in their seal capability.

In the second prior art the first seal ring 152 and the second seal ring 153 are supported by the first O-ring 155 and the second O-ring 156, respectively. However, the urging force is originated from the resilient reaction force due to a small deformation in the compressed rubber materials of the first O-ring 155 and the second O-ring 156. Therefore the resilient urging force will quickly decrease as the rubber deformation gets small. For that reason the initial resilient urging force of the first O-ring 155 and the second O-ring 156 needs to be set relatively high by taking a subsequent stress relaxation into consideration. This, however, leads to the acceleration of abrasion of the seal surfaces 152A and 153A due to the high urging contact force.

Since the first seal ring 152 and the second seal ring 153 are exerted a resiliently urging force by the first O-ring 155 and the second O-ring 156 which are elastically deformed under compressive forces, a progress of the stress relaxation in the first O-ring 155 and the second O-ring 156 decreases their elasticity, as time proceeds, to provide a resiliently urging force to the seal surfaces 152A and 153A. Furthermore if slurry is introduced to the joint surface of the first O-ring 155 or the second O-ring 156, the slurry particles trapped at the joint surface of the first O-ring 155 or the second O-ring 156, respectively, cause an abrasion of the first O-ring 155 or the second O-ring 156.

The present invention is introduced to alleviate the above mentioned problems. A primary technical goal which this invention tries to achieve is to prevent the abrasion of seal surfaces even under the influence of a process fluid of high pressure or containing slurry. Another goal is to prevent the abrasion of seal surfaces attached with resilient seal rings and to improve the seal capability even when the seal surfaces are subjected to a muddy fluid or the like. Yet another goal is to prevent the stress relaxation of the resilient seal rings in conjunction with elastic deformation and to maintain the seal capability of the resilient seal rings.

BRIEF SUMMARY OF THE INVENTION

A primary object of the present invention is to alleviate the above mentioned technical disadvantages, and a solution to such disadvantages is embodied as follows.

A seal device constructed in accordance with the principles of the present invention is a seal device to provide a seal between one component and the other component which make a rotary motion relative to each other.

The seal device retains a first seal ring which has a first seal surface at one end and a first retainer portion on the opposite end of the first seal surface.

It also retains a second seal ring which has a second seal surface coming in a seal-tight contact against the first seal surface of the first seal ring and a second retainer portion on the opposite end of the second seal surface.

Furthermore the seal device disposes a first resilient seal ring, made of a rubber resilient material, which has a first resilient seal portion urging the first seal surface of the first seal ring against the second seal surface of the second seal ring, a second seal portion being located on one end of the first resilient seal portion and mating with the first retainer portion of the first seal ring, and a first seal portion being located on the other end of the first resilient seal portion and being in a sealing relation with the one component.

The seal device also disposes a second resilient seal ring, made of a rubber resilient material, which has a second resilient seal portion urging the second seal surface of the second seal ring against the first seal surface of the first seal ring, a second seal portion being located on one end of the second resilient seal portion and mating with the second retainer portion of the second seal ring, and a first seal portion being located on the other end of the second resilient seal portion and being in a sealing relation with the other component.

The first resilient seal ring disposes a first reinforcement ring which retains a first elastic portion providing a reinforcement to the first resilient seal portion, a first support portion providing a support to the first seal portion at one end of the first elastic portion and a second support portion providing a support to the second seal portion at the other end of the first elastic portion.

The second resilient seal ring disposes a second reinforcement ring which retains a second elastic portion providing a reinforcement to the second resilient seal portion, a first support portion providing a support to the first seal portion at one end of the second elastic portion and a second support portion providing a support to the second seal portion at the other end of the second elastic portion.

In a seal device related to the present invention, since a first seal portion of a first resilient body element and a first seal portion of a second resilient body element are supported by individual first support portions the respective first seal portions effectively maintain stable sealing relations with individual mounting surfaces. Also the individual support portions are capable of providing a secure support to the first resilient seal portion and the second resilient seal portion even when the individual first seal portions are subject to external forces. Therefore the individual first seal portions hardly allow slurry or impurities to go into the interface between the first seal portion and its mating fixing portion, and a decline of the seal capability at the interfaces due to wear of the first seal portions is effectively prevented. A second seal portion of the first resilient body element as well as a second seal portion of the second resilient body element provide a similar effect to the first seal portions do. In particular, the individual second seal portions provide a secure support against the seal rings. And a first elastic portion and second elastic portion give a resilient reinforcement to the first resilient seal portion and the second resilient seal portion, respectively, such that a decrease in the elastic force due to a stress relaxation of the first resilient seal portion and the second resilient seal portion is supplemented.

According to the seal device, attaching a first reinforcement ring and a second reinforcement ring in an integral manner to the first resilient seal ring and the second resilient seal ring further effects a secure contact by urging the individual first seal portions against one component and the other component, respectively, by means of the individual first support portions. Also the individual second support portions resiliently urge the individual second seal portions against the first seal ring and the second seal ring, respectively. Therefore even if slurry gets into the interface between the second seal portion and the first seal ring or between the second seal portion and the second seal ring the impurities resiliently held by the interfaces of the second seal portions do not cause wear of the interfaces. In addition resilient forces of the first resilient seal portion and the second resilient seal portion can be adjusted, respectively, by means of the first reinforcement ring and the second reinforcement ring. This enables an accurate design of the resilient forces of the first resilient seal portion and the second resilient seal portion. Furthermore possible stress relaxations in the first resilient body element and the second resilient body element can be compensated, respectively, by the first reinforcement ring and the second reinforcement ring for the lasting exhibition of substantial elastic forces against the first seal ring and the second seal ring.

DETAILED DESCRIPTION OF THE INVENTION

Figure 1:
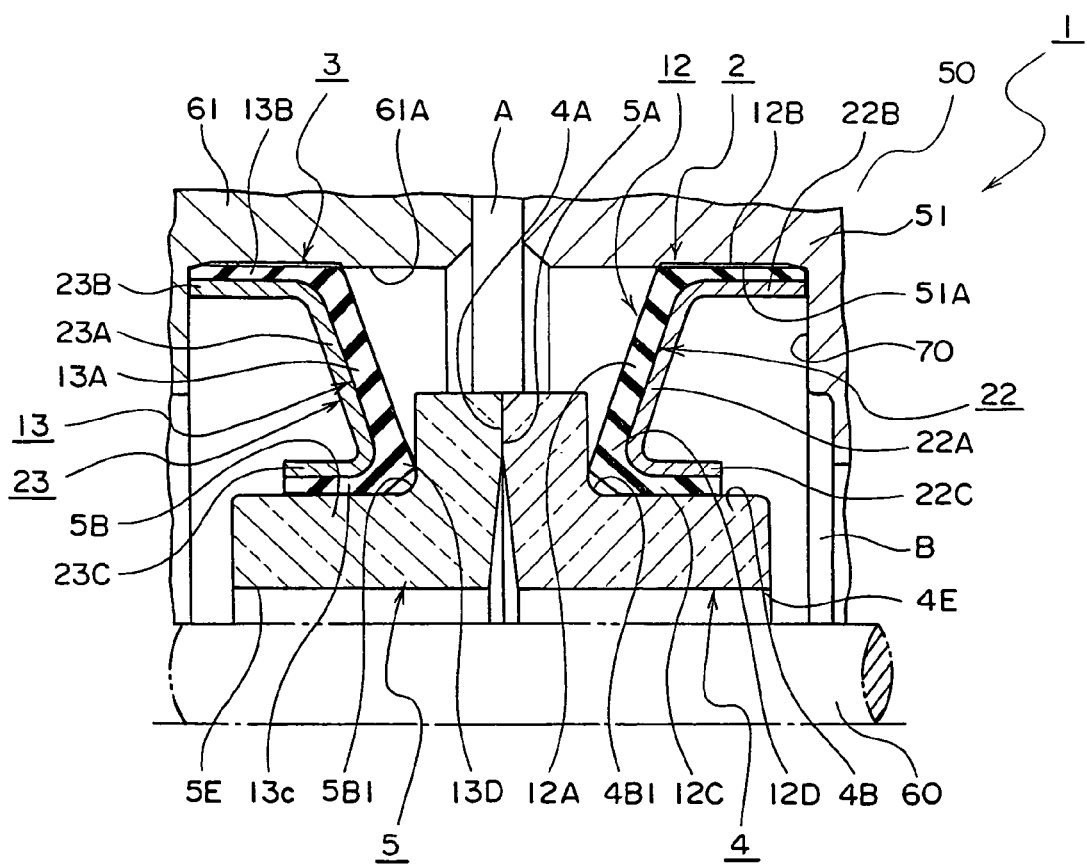
FIG. 1 is a cross-sectional view of a half portion of a seal device illustrating a first embodiment related to the present invention.
Figure 2:
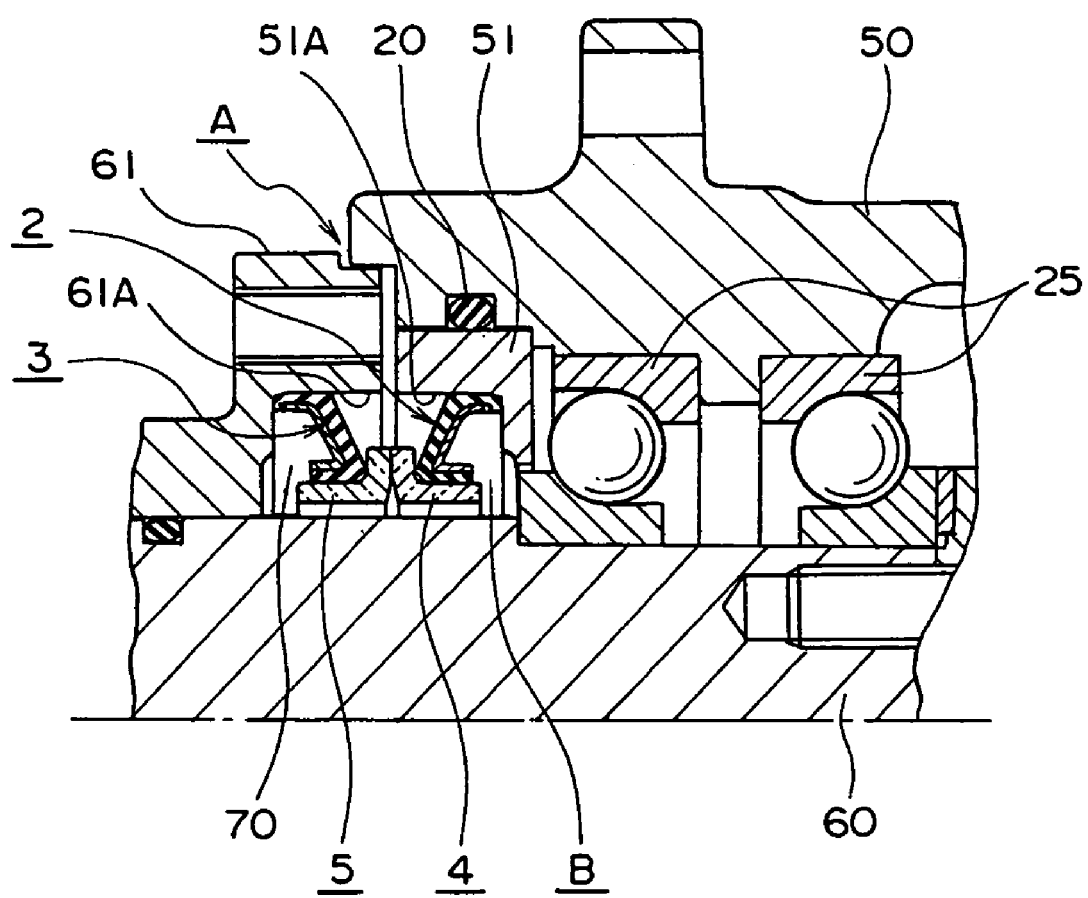
FIG. 2 is a cross-sectional view of a half portion of a reduction gear unit mounting the seal device of FIG. 1.

Described below is details of the figures of preferred embodiments of the present invention according to actual design drawings with accurate dimensional relations. FIG. 1 is a cross-sectional view of a half portion of a seal device 1 illustrating a first embodiment related to the present invention. FIG. 2 is a cross-sectional view of a half portion of a reduction gear unit mounting the seal device 1 of FIG. 1.

In FIG. 1 and FIG. 2, the seal device 1 is disposed within a seal chamber 70 which is formed between a roller 50 and a shaft 60. The seal chamber 70 is defined as an inner space surrounded by the shaft 60, a first fixture surface 51A of a bushing 51 which is mounted via a O-ring 20 at the end portion of the roller 50, and a second fixture surface 61A of a cover 61 which is attached to the shaft 60. This seal chamber 70 communicates with an ambient communication passage A.

The seal device 1 retains a first resilient seal ring 2 and a second resilient seal ring 3. The first resilient seal ring 2 consists of an annularly shaped first resilient body member 12 made of rubber and a first reinforcement ring 22 made of metal which are joined together to form an integral part. The main body of the first resilient body member 12 defines a slanted first resilient seal portion 12A. Furthermore the outer perimeter wall of the first resilient seal portion 12A defines a first seal portion 12B (it is hereafter called a first outer perimeter seal portion) while the inner perimeter wall defines a second seal portion 12C (it is hereafter called a second inner perimeter seal portion). The outer surface of the first outer perimeter seal portion 12B may dispose a plurality of ridges such that the outer surface exhibits a better contact with the first fixture surface 51A. The second inner perimeter seal portion 12C fits the outer diameter surface of a cylindrical first retainer portion 4B of a first seal ring 4. A bent corner of the second inner perimeter seal portion 12C, defined as a first joint portion 12D, make a sealing contact with a first corner portion 4B1 of the first seal ring 4. The contact surface of the second inner perimeter seal portion 12C may well be prepared with a wavy surface profile in its cross-section for a better contact (not shown in the figure).

The first resilient body member 12 of the first resilient seal ring 2 is made of a rubber material such as nitrile rubber (NBR) of hardness DuroA 60 to 70, urethane rubber (U), fluoro rubber (FKM), isobutylene-isoprene rubber(IIR), elastic resin or the like.

The first reinforcement ring 22 is adhesively joined with the annularly shaped sidewall of the first resilient body member 12. The overall shape of the first reinforcement ring 22 is similar to the first resilient body member 12 and the ring 22 is made of a steel plate or a resin which is harder than the first resilient body member 12. The main body of the first reinforcement ring 22 defines a first elastic portion 22A which is slanted similarly to the first resilient seal portion 12A. The outer perimeter surface of the first elastic portion 22A defines a first support portion 22B (it is hereafter called a first outer perimeter support portion). The first outer perimeter support portion 22B comes in an adhesive contact with the inner surface of the first outer perimeter seal portion 12B, and provides the first outer perimeter seal portion 12B with an elastic support by forming a close contact between the first outer perimeter seal portion 12B and the first fixture surface 51A.

The inner perimeter surface of the first elastic portion 22A defines a second support portion 22C (it is hereafter called a second inner perimeter support portion). The second inner perimeter support portion 22C comes in an adhesive contact with the outer surface of the second inner perimeter seal portion 12C, and provides the first outer perimeter seal portion 12B with an elastic support by forming a close contact between the second inner perimeter seal portion 12C and the first seal ring 4. The first reinforcement ring 22 is made of spring steel, stainless steel, hard resin or the like. Such a material in a sheet form is press-formed to fabricate the first reinforcement ring 22.

The second resilient seal ring 3, which is disposed in a symmetric manner relative to the first resilient seal ring 2, has a symmetric shape relative to the first resilient seal ring 2. The second resilient seal ring 3 consists of a second resilient body member 13 and a second reinforcement ring 23 which are assembled in an integral manner. The second resilient body member 13 retains a second resilient seal portion 13A which is disposed at an angle. Furthermore the outer perimeter wall of the second resilient seal portion 13A defines a first seal portion 13B (it is hereafter called a first outer perimeter seal portion) while the inner perimeter wall defines a second seal portion 13C (it is hereafter called a second inner perimeter seal portion). The outer surface of the first outer perimeter seal portion 13B may dispose a plurality of ridges which do not appear in the figure such that the outer surface exhibits a better contact with the second fixture surface 61A. The second inner perimeter seal portion 13C fits the outer diameter surface of a cylindrical first retainer portion 4B of a second seal ring 5. A bent corner of the second inner perimeter seal portion 13C, defined as a second joint portion 13D, make a sealing contact with a second corner portion 5B1 of the second seal ring 5. The contact surface of the second inner perimeter seal portion 13C may well be prepared with a wavy surface profile in its cross-section for a seal-tight contact which is not shown in the figure.

The second resilient body member 13 of the second resilient seal ring 3 is, similarly to the first resilient body member 12, made of a rubber material such as nitrile rubber (NBR) of hardness DuroA 60 to 70, urethane rubber (U), fluoro rubber (FKM), isobutylene-isoprene rubber (IIR), elastic resin or the like.

The second reinforcement ring 23 is adhesively joined with the annularly shaped sidewall of the second resilient body member 13. The overall shape of the second reinforcement ring 23 is similar to the second resilient body member 13 and the ring 23 is made of a steel plate or a resin which is harder than the second resilient body member 13. The main body of the second reinforcement ring 23 defines a second elastic portion 23A which is slanted similarly to the second resilient seal portion 13A. The outer perimeter surface of the second elastic portion 23A defines a first support portion 23B (it is hereafter called a first outer perimeter support portion). In addition a second elastic support portion 23C (it is hereafter called a second inner perimeter support portion) is disposed at the radially inward end of the second elastic portion 23A where the second inner perimeter support portion 23C comes in an adhesive contact with the second inner perimeter seal portion 13C. The second reinforcement ring 23 is made of spring steel, stainless steel, hard resin or the like. Such a material in a sheet form is press-formed to fabricate the second reinforcement ring 23.

The pair of the first seal ring 4 and the second seal ring 5 are disposed in a symmetrical manner, and the first seal ring 4 and the second seal ring 5 have a symmetrically identical shape with respect to the interface where the first seal surface 4A and the second seal surface 5A come in contact with each other. In more details, the first seal ring 4 has an annularly shaped body with an L-shaped cross-section, which consists of a flange portion and a cylinder portion. The end face of the flange portion of the first seal ring 4 defines the first seal surface 4A. The radially inward portion of the first seal surface 4A forms a tapered surface such that the first seal surface 4A does not come in contact with the opposed radially inward portion of the second seal surface 5A. The cylindrical portion of the first seal ring 4 defines a first retainer portion 4B. The flange side of the first retainer portion 4B then defines a first corner portion 4B1, and an inner diameter surface 4E of the first seal ring 4 defining a bore maintains a clearance relative to the shaft 60.

The mating second seal ring 5 has an annularly shaped body with an L-shaped cross-section, which consists of a flange portion and a cylinder portion. The end face of the flange portion of the second seal ring 5 defines the second seal surface 5A. The radially inward portion of the second seal surface 5A forms an axially tapered surface such that the second seal surface 5A does not come in contact with the opposed radially inward portion of the first seal surface 4A. The cylindrical portion of the second seal ring 5 defines a second retainer portion 5B. The flange side of the second retainer portion 5B then defines a second corner portion 5B1, and an inner diameter surface 5E of the second seal ring 5 defining a bore maintains a clearance relative to the shaft 60.

The first seal ring 4 and the second seal ring 5 are made of cast iron, SiC, super-hard alloy, alumina ceramics or the like. Or one of the first seal ring 4 and the second seal ring 5 can be made of carbon material. Compression molding is applied to these materials for forming the first seal ring 4 and the second seal ring 5.

In the first resilient seal ring 2 thus constructed, as seen in FIG. 1 and FIG. 2, the first outer perimeter seal portion 12B fits the first fixture surface 51A of the bushing 51 while the inner diameter surface of the second inner perimeter seal portion 12C fits the first retainer portion 4B of the first seal ring 4. Under this circumstance, the first joint portion 12D engages the first corner portion 4B1 so as to provide a resilient support for the first seal ring 4. The first seal surface 4A of the first seal ring 4 is resiliently urged toward the second seal surface 5A of the second seal ring 5 by the spring force which is generated by the first resilient seal portion 12A as well as the first elastic portion 22A of the first resilient seal ring 2. Therefore, the first reinforcement ring 22 disposing the first elastic portion 22A effectively prevents the second inner perimeter seal portion 12C from being displaced toward the internal chamber B by the pressure coming through the ambient passage A.

As for the second resilient seal ring 3, the first outer perimeter seal portion 13B, just like in the first resilient seal ring 2, fits the second fixture surface 61A while the inner diameter surface of the second inner perimeter seal portion 13C fits the second retainer portion 5B of the second seal ring 5. Under this circumstance, the second joint portion 13D engages the second corner portion 5B1 so as to provide a resilient support for the second seal ring 5. The second seal surface 5A of the first seal ring 5 is resiliently urged toward the first seal surface 4A of the first seal ring 4 by the spring force which is generated by the second resilient seal portion 13A as well as the second elastic portion 23A of the second resilient seal ring 3. Consequently, the second reinforcement ring 23 disposing the second elastic portion 23A effectively prevents the second inner perimeter seal portion 13C from being displaced toward the internal chamber B by the pressure coming through the ambient passage A. Therefore, the second resilient seal ring 3 is able to provide the second seal surface 5A with a sufficient, resilient force for maintaining a seal-tight contact relative to the first seal surface 4A. In the seal device 1 illustrated in FIG. 2, the first seal ring 4 is subjected to a rotary motion as the roller 50 rotates. The second seal ring 5, on the other hand, remains stationary. Arrangement of the rotating first seal ring 4 and the stationary second seal ring 5 can be swapped depending on the purpose of a machine wherein the seal device 1 is installed.

The seal device 1 effects a seal against a gradually increased pressure fluid, muddy water or the like which is allowed to flow in through the ambient passage A as the roller 50 rotates. In an adjacency of the internal chamber B, the roller 50 and the shaft 60 dispose bearings 25 therebetween and lubricants applied thereto. Even if the lubricants exert a pressure to the first resilient seal ring 2 and the second resilient seal ring 3, the support offered by the first reinforcement ring 22 and the second reinforcement ring 23, respectively, maintain elastic deformation of the rings without a drop of the seal capability. The resilient forces of the first reinforcement ring 22 and the second reinforcement ring 23 will rather lead to enhancing the seal capability as the result of more secure contact between the two seal surfaces 4A, 5A.

Figure 3:
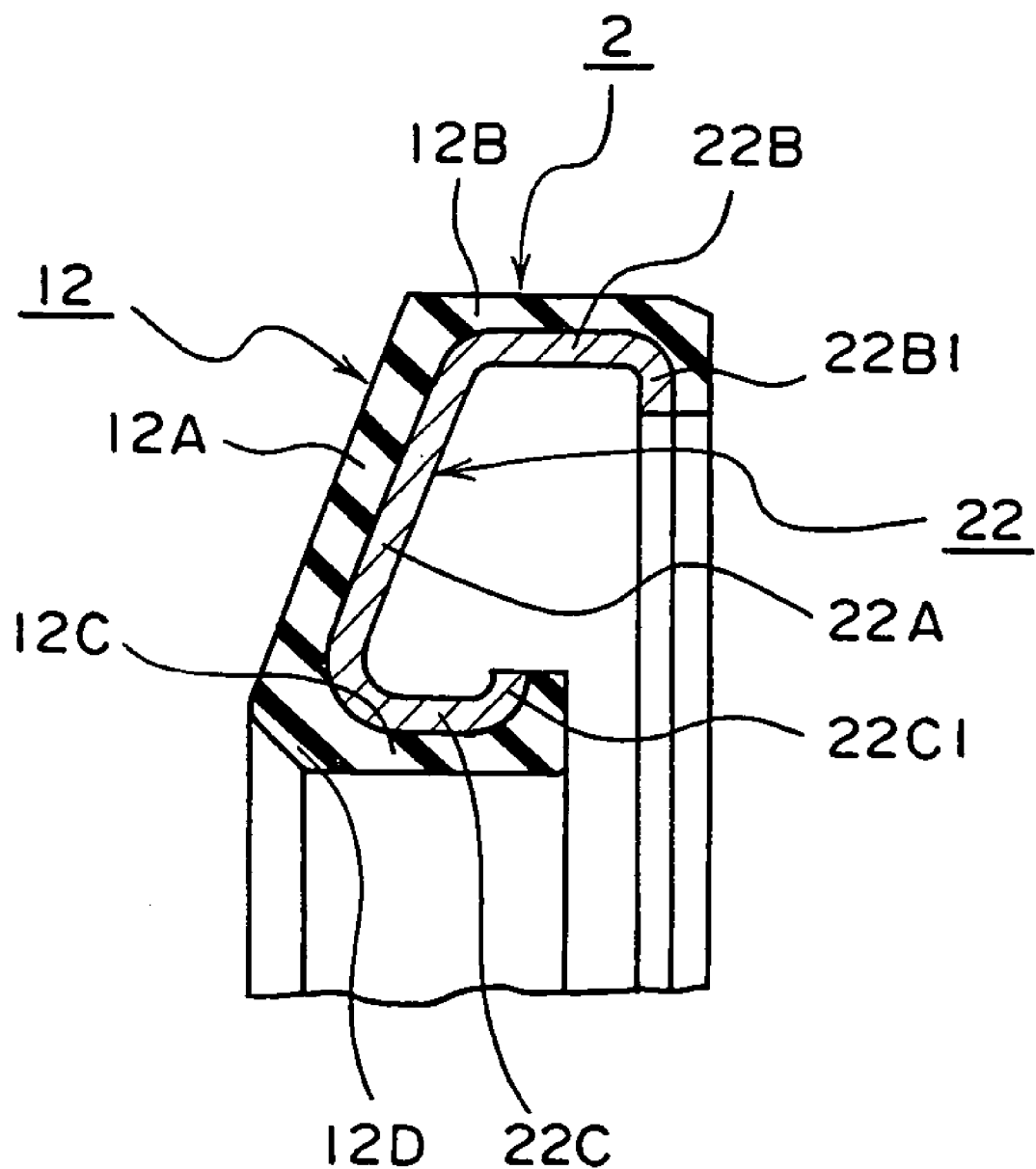
FIG. 3 is a cross-sectional view of a half portion of a first resilient seal ring used for a seal device illustrating a second embodiment related to the present invention.

FIG. 3 shows a half cross-sectional view of a first resilient seal ring 2 as a second preferred embodiment of the present invention. As clearly seen in FIG. 1, the second resilient seal ring 3 is made symmetric in relation to the first resilient seal ring 2 in terms of its arrangement and shape. Description of the second resilient seal ring 3 is therefore omitted. The first resilient seal ring 2 (similarly the second resilient seal ring 3) of FIG. 3 differs from that of FIG. 1 in the sense that the end portion of the first outer perimeter support portion 22B of the first reinforcement ring 22 is bent radially inward, which is defined as a first reinforcement portion 22B1, and also that the second inner perimeter support portion 22C is bent radially outward, which is defined as a second reinforcement portion 22C1.

The first reinforcement ring 22 thus arranged results in the improved strength of the first outer perimeter support portion 22B and the second inner perimeter support portion 22C after being mounted therein. Also arranging a plurality of ridge-shaped seal portions, not shown in the figure, on the perimeter surfaces of the first outer perimeter seal portion 12B and the second inner perimeter seal portion 12C not only is capable of the resilient fit thereof but also is able to improve the seal performance thereof. Parts indicated by other numerals in FIG. 3 can be considered to be more or less the same in their forms and dimensions as those at the same numerals of FIG. 1.

Figure 4:
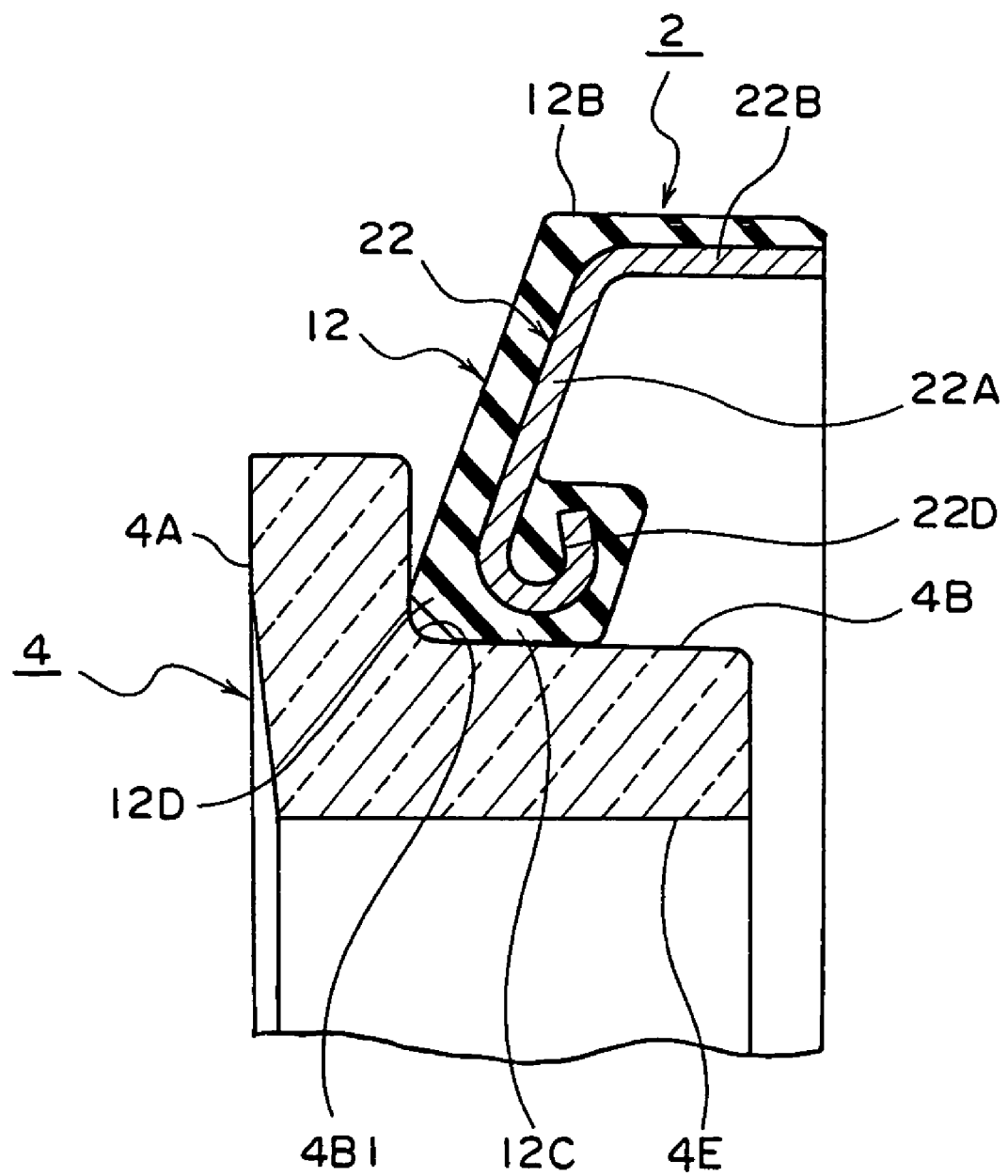
FIG. 4 is a cross-sectional view of a half portion of a first resilient seal ring used for a seal device illustrating a third embodiment related to the present invention.

FIG. 4 shows a half cross-sectional view of a first resilient seal ring 2 as a third preferred embodiment of the present invention. A first resilient seal ring 2 of FIG. 4 is obtained by bending a second inner perimeter support portion 22C of the first resilient seal ring 2 shown in FIG. 1 to form a circular arc which is defined as a third support portion 22D (bending support portion). Embedding, in this way, the third support portion 22D of the first reinforcement ring 22 in a second inner perimeter seal portion 12C makes the third support portion 22D be integrated with the second inner perimeter seal portion 12C and enables the third support portion 22D to effect a secure, seal fit in relation to a first seal ring 4 via the second inner perimeter seal portion 12C. As the result, the seal performance of the second inner perimeter seal portion 12C against the first seal ring 4 will improve. In addition a sufficient, resilient support of the first elastic portion 22A is provided for accommodating to excursions of the first seal ring 4 in use. Parts indicated by other numerals in FIG. 4 can be considered to be more or less the same in their forms and dimensions as those at the same numerals of FIG. 1.

Figure 5:
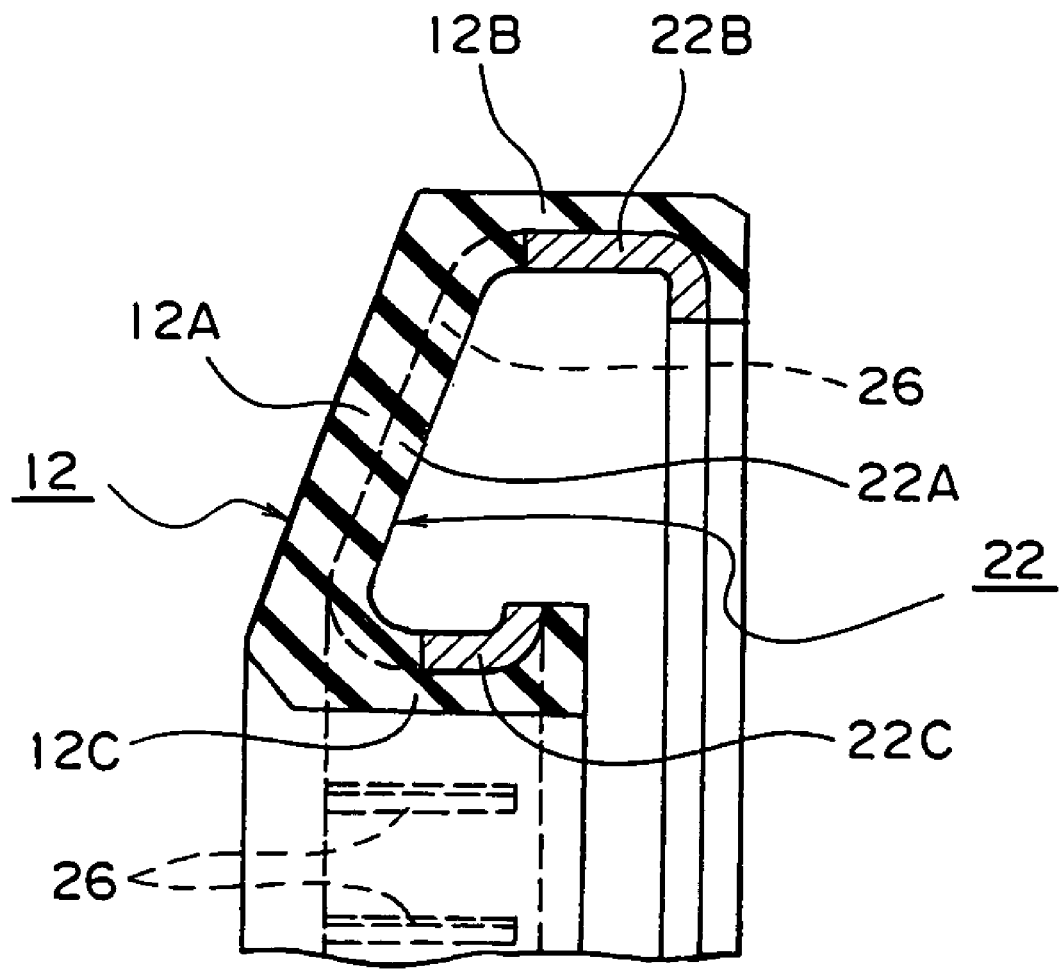
FIG. 5 is a cross-sectional view of a half portion of a first resilient seal ring used for a seal device illustrating a fourth embodiment related to the present invention.

FIG. 5 shows a half cross-sectional view of a first resilient seal ring 2 as a fourth preferred embodiment of the present invention. The first resilient seal ring 2 of FIG. 5 differs from that of FIG. 3 in that a plurality of slit portions 26 are disposed along the circumference of a first elastic portion 22A of a first reinforcement ring 22 wherein the slit portions 26 are located essentially in a equally spaced manner. This makes it possible that when the first resilient body member 12 is molded with a rubber material, a portion of a first resilient seal portion 12A gets inside the slit portions 26 of the first reinforcement ring 22 to form an integral structure therewith (note that every resilient seal portion 12A, 13A does not need to be integral with its mating slit portion 26 to obtain a similar effect). Disposing the slit portions 26 in this way in the first reinforcement ring 22 of the first resilient seal ring 2 effects an optimal design for the resilient strength by means of adjusting the leaf spring means between adjacent slit portions 26 as well as for the degree of contact between the first reinforcement ring 22 and the first resilient body member 12.

That is, adjusting the strip width between adjacent slit portions 26 of the first elastic portion 22A allows one to choose a desirable, resiliently urging force against a first seal ring 4. Therefore, the resiliently, urging, contact force thus provided at a first seal surface 4A effectively leads to avoiding wear of the first seal surface 4A and a second seal surface 5A as well as excessive contact forces at these seal surfaces. The slit portion 26 has a narrow width extending along the circumference wherein the slit is manufactured by a machine tool such as slotting or end-mill. The slit portion 26 whose width is relatively wide may be defined as a notch portion. Such a notch portion may be fabricated as a rectangular window radially extending in the first elastic portion 22A and the second elastic portion 23A. The slit portion 26 (or notch portion) can be further extended to a portion of a first support portion 22B and/or a second support portion 22C of the first reinforcement ring 22. The dimension of the notch portion can be arbitrarily determined according to considerations taken on the slit portion 26 of FIG. 5. Parts indicated by other numerals in FIG. 5 can be considered to be more or less the same in their forms and dimensions as those at the same numerals of FIG. 1.

Figure 6:
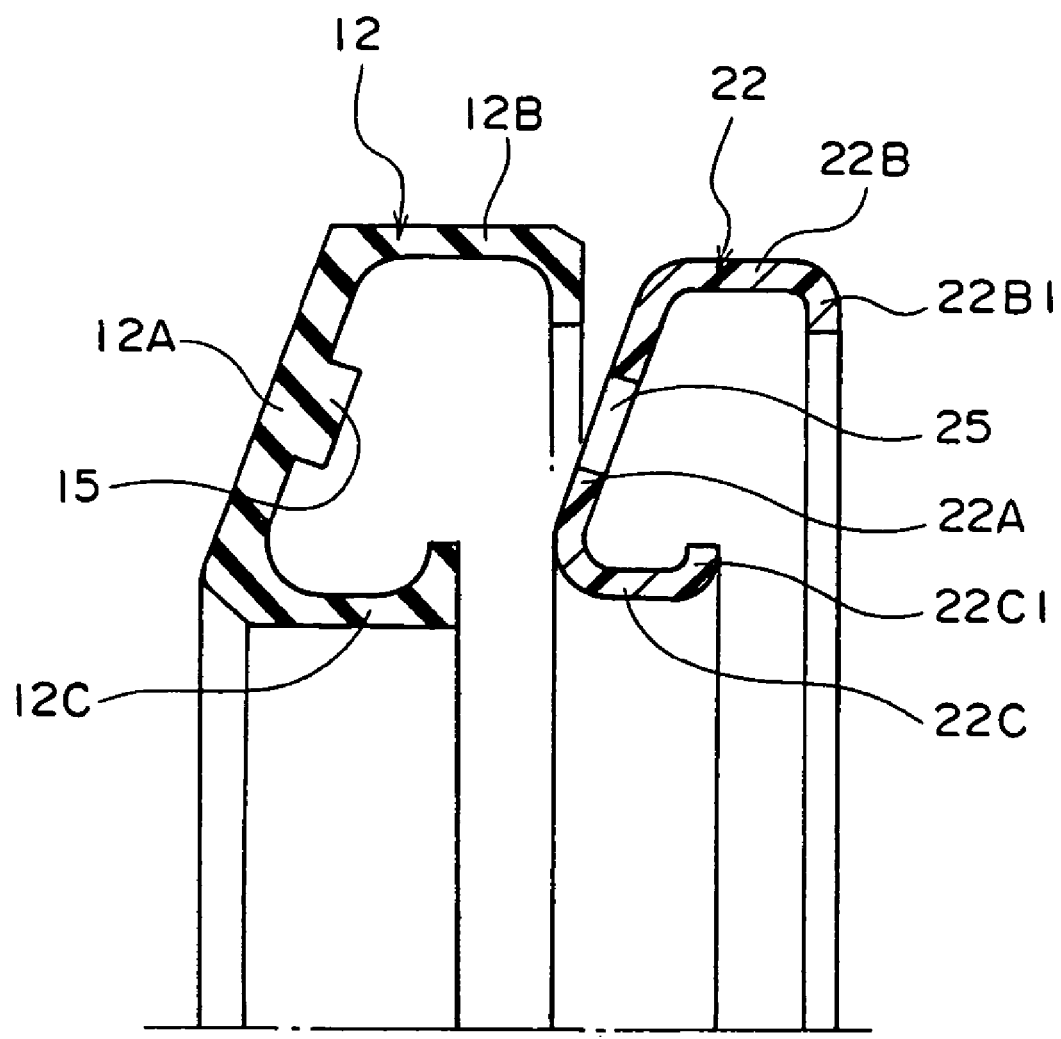
FIG. 6 is a cross-sectional view of a half portion of a first resilient seal ring used for a seal device illustrating a fifth embodiment related to the present invention.

FIG. 6 shows a half cross-sectional view of a first resilient seal ring 2 as a fifth preferred embodiment of the present invention. The first resilient seal ring 2 of FIG. 6 disposes a protruded mating portion 15 on one of the annular side surfaces of a first resilient body member 12. The first reinforcement ring 22 also disposes, at a location corresponding to the mating portion 15, a mount bore 25 which is a through hole. Inserting the mating portion 15 into the mount bore 25 makes an integral construction of the first resilient body member 12 and the first reinforcement ring 22. The first resilient body member 12 thus arranged is able to improve elastic support capability against a first seal ring 4 of a first elastic portion 22A by means of the mount bore 25 disposed in the first reinforcement ring 22. In addition the first resilient body member 12 and the first reinforcement ring 22 can be manufactured individually and be assembled when needed. Since the mount bore 25 of the first reinforcement ring 22 is capable of mating with the mating portion 15, detachment of the first reinforcement ring 22 from the first resilient body member 12 can effectively be prevented even if the contact strength between the two components decreases due to a rubber material used in the first resilient body member 12. Parts indicated by other numerals in FIG. 6 can be considered to be more or less the same in their forms and dimensions as those at the same numerals of FIG. 1.

Figure 7:
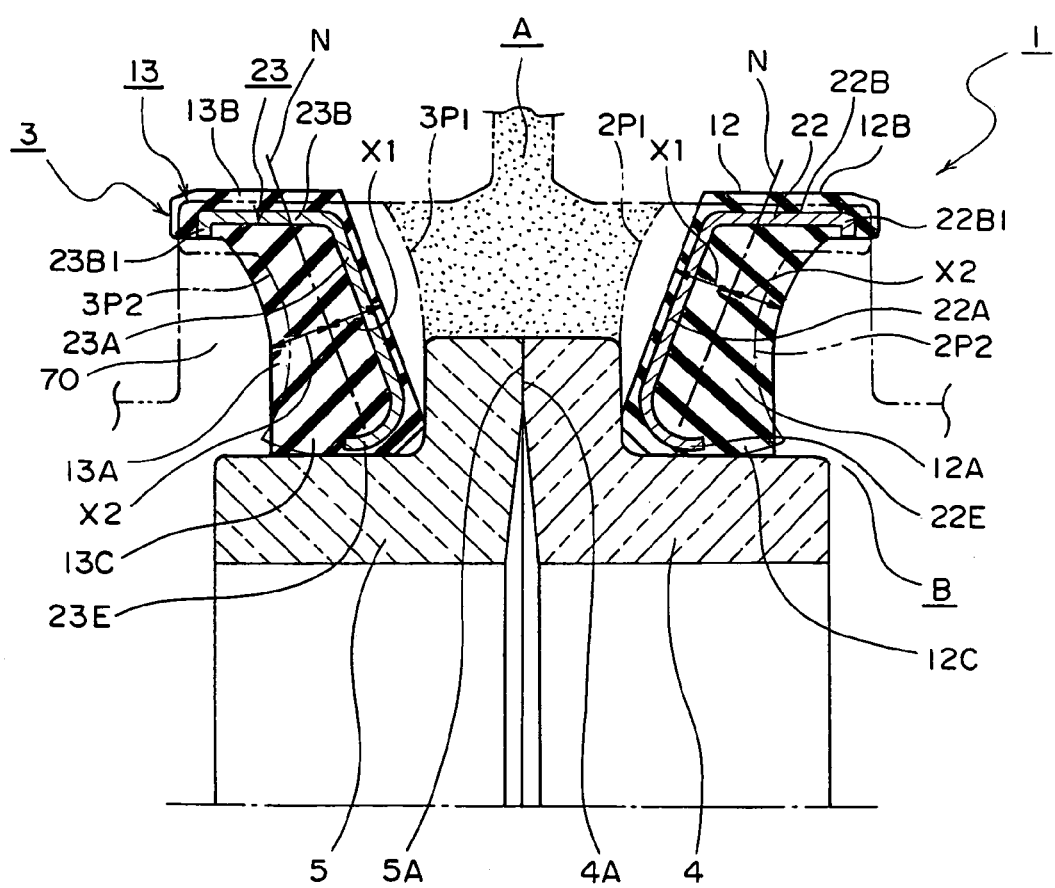
FIG. 7 is a cross-sectional view of a half portion of a seal device illustrating a sixth embodiment related to the present invention.
Figure 8:
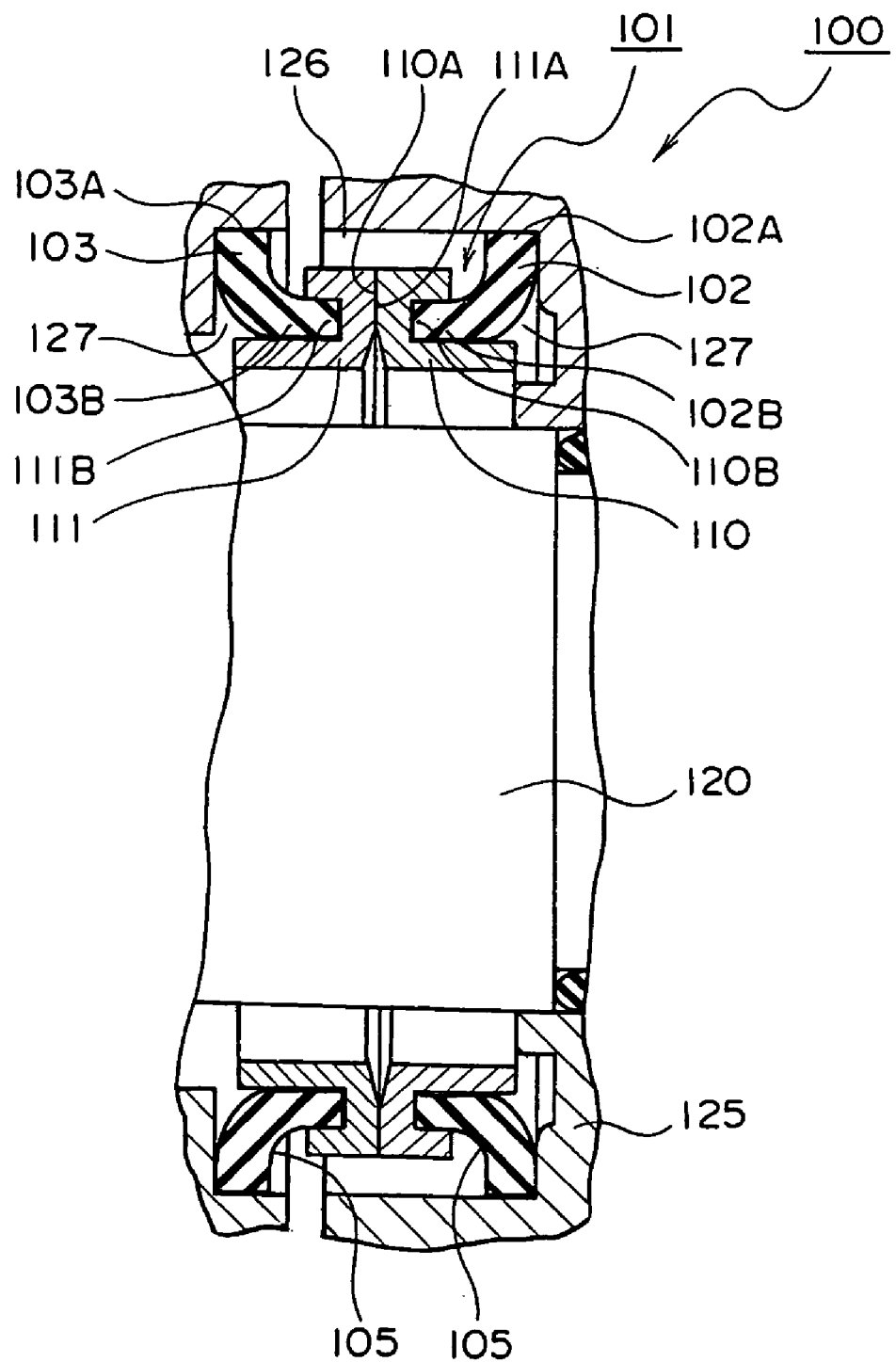
FIG. 8 is a cross-sectional view of a seal device of a first prior art related to the present invention.
Figure 9:
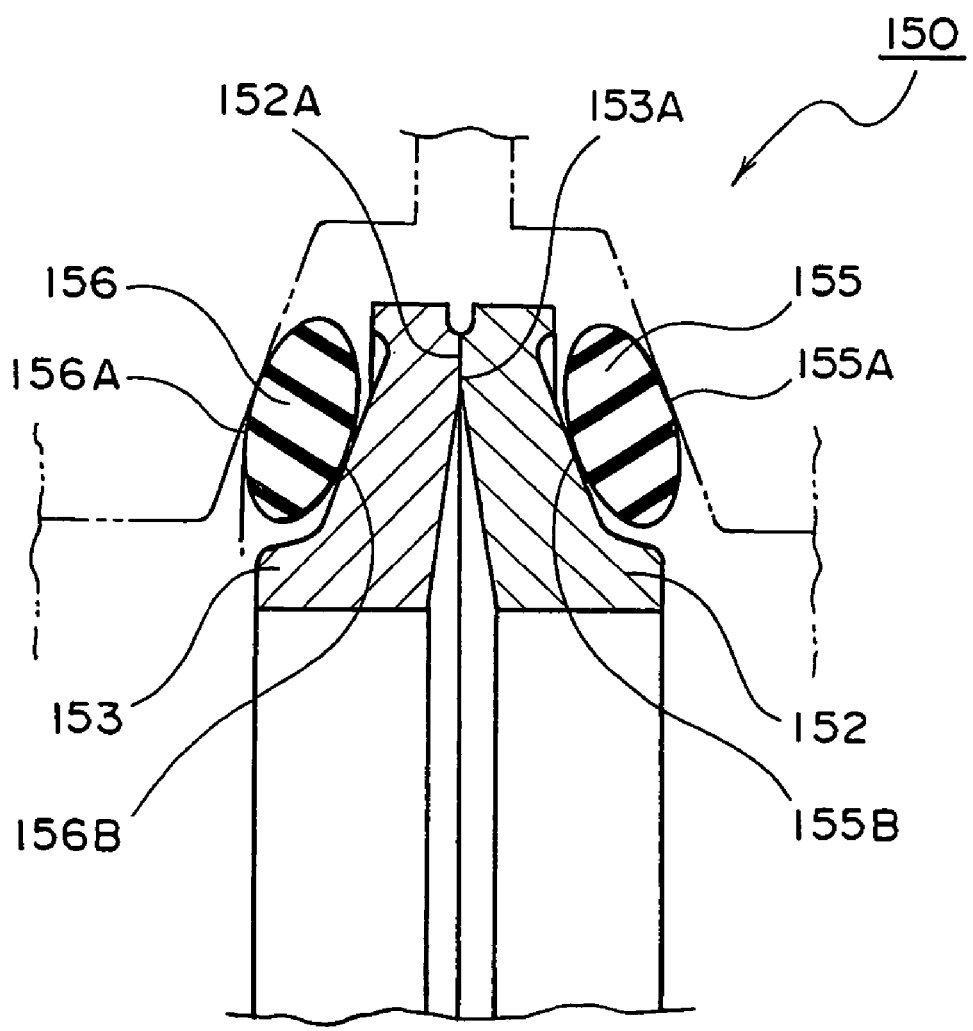
FIG. 9 is a cross-sectional view of a half portion of a seal device of a second prior art related to the present invention.

FIG. 7 shows a half cross-sectional view of a seal 1 as a sixth preferred embodiment of the present invention. The seal 1 of FIG. 7 differs from that of FIG. 1 in that the first reinforcement ring 22 and the second reinforcement ring 23, respectively, are embedded within the first resilient body member 12 adjacent the first opposing surface 2P1 (ambient passage A side) and the second resilient body member 13 adjacent the second opposing surface 3P1 (ambient passage A side). The first reinforcement ring 22 and the second reinforcement ring 23 are preferably located toward the first opposing surface 2P1 relative to the neutral line N of the first resilient body member 12 and toward the second opposing surface 3P1 relative to the neutral line N of the second resilient body member 13, respectively. The individual neutral lines N are defined at a distance X1 from the opposing surface 2P1 of the first resilient body member 12 and also X1 from the opposing surface 3P1 of the second resilient body member 13, respectively, and X2 from a first back surface 2P2 and a second back surface 3P2, respectively.

Comparing with the first resilient body member 12 and the second resilient body member 13 in FIG. 1, thickness of the first resilient body member 12 and the second resilient body member 13 in FIG. 7 is increased to X1+X2. In this way, the first reinforcement ring 22 and the second reinforcement ring 23 of FIG. 7 can be made thinner than the first reinforcement ring 22 and the second reinforcement ring 23 of FIG. 1, and the end portions of the first outer perimeter support portion 22B of the first reinforcement ring 22 and the second outer perimeter support portion 23B of the second reinforcement ring 23 are both bent radially inward, which are defined as a first reinforcement portion 22B1 and a second reinforcement portion 23B1, respectively. Also the second inner support portion 22C and the second inner support portion 23C of FIG. 1 are circularly bent, respectively, to form a fourth support portion (elastic support portion) 22E and a fourth support portion (elastic support portion) 23E.

The first resilient seal ring 2 is disposed between the first seal ring 4 and the bushing 51 while the second resilient seal ring 3 is between the second seal ring 5 and the cover 61. For an improvement of the seal capability, the first opposing surface 2P1 and the second opposing surface 3P1 and, respectively, the first back surface 2P2 and the second back surface 3P2 preferably undergo elastic deformation, as shown in FIG. 7, such that they form a convex shape toward the ambient passage side A. Such elastic deformation as shown in FIG. 7 of the first resilient seal ring 2 and the second resilient seal ring 3 enables the first resilient seal ring 2 and the second resilient seal ring 3 to sustain high pressure of the fluid incoming from the ambient passage A, owing to the reaction forces provided by the first reinforcement ring 22 and the second reinforcement ring 23. The first reinforcement ring 22 also prevents the second inner perimeter seal portion 12C from coming off the first seal ring 4 toward the internal chamber B. Similarly the second reinforcement ring 23 prevents the second inner perimeter seal portion 13C from coming off the second seal ring 5 in the outward direction. Therefore an improvement of the contact between the second inner perimeter seal portion 12C and the first seal ring 4 is achieved. So is the contact between the second inner perimeter seal portion 13C and the second seal ring 5.

The first resilient seal ring 2 which appears in FIG. 3 through FIG. 7 is made of a rubber material such as nitrile rubber, silicone rubber, fluoro-rubber, acrylic rubber, styrene rubber, ethylene propylene rubber, urethane rubber or the like. Although FIG. 3 through FIG. 6 show the first resilient seal ring 2 alone, the second resilient seal ring 3 is merely arranged in a symmetric manner relative to the first resilient seal ring 2 and a shape and material used is more or less the same as the first resilient seal ring 2.

The first resilient body member 12 of the first resilient seal ring 2 and the second resilient body member 13 of the second resilient seal ring 3 are reinforced with respect to elasticity by means of the first reinforcement ring 22 and the second reinforcement ring 23, respectively. Therefore a soft rubber or resin can be used as a material for the second resilient body member 13 as well as for the first resilient body member 12. In this way, the first outer perimeter seal portion 12B, the first outer perimeter seal portion 13B, the second inner perimeter seal portion 12C, and the second inner perimeter seal portion 13C, can improve the seal capability at the respective seal surfaces with their corresponding mating portions, i.e., the first fixture surface 51A, the second fixture surface 52A, the first retainer portion 4B and the second retainer portion 5B.

Furthermore the use of a soft rubber material for the inner and outer seal portions 12B, 12C, 13B, 13C effectively prevents wear of the inner and outer seal portions 12B, 12C, 13B, 13C even if slurry deposits on the contact surfaces of the inner and outer seal portions 12B, 12C, 13B, 13C. Also the first resilient seal ring 2 of FIG. 1 can be substituted by first resilient seal ring 2 of FIG. 7. Likewise the second resilient seal ring 3 of FIG. 1 can be substituted by the second resilient seal ring 3 of FIG. 3. This implies that different forms of the first resilient seal ring 2 and the second resilient seal ring 3 can be combined according to the operational conditions of the fluid and pressure of the internal chamber B. This kind of combination allows the first seal surface 4A and the second seal surface 5A to effectively come in sealing contact even under the above mentioned difficult situations. Thus a seal capability of the first and second seal surfaces 4A, 5A improves.

Described next is an alternative embodiment related to the present invention.

In a seal device 1 as a second preferred embodiment related to the present invention, at least one of a first elastic portion 22A of a first reinforcement ring 22 and a second elastic portion 23A of a second reinforcement ring 23 retains a plurality of notch portions 26 or slit portions 26 along the perimeter surface.

Since the seal device 1 related to the second embodiment disposes the first reinforcement ring 22 and/or the second reinforcement ring 23 with notch portions 26 or slit portions 26 therein, the individual elastic portions 22A, 23A between the adjacent notches 26 or slits 26 can be considered as leaf springs, so that the resilient forces exerted by the elastic portions 22A, 23A can be arbitrarily designed (or spring forces of the elastic portions 22A, 23A can be adjusted according to design specifications). At the same time, introducing a portion of the material of the resilient seal portions 12A, 13A into the notch portions 26 or the slit portions 26 in the manufacturing process of the resilient seal portions 12A, 13A, provides an improvement on the integral force between the individual resilient seal portions 12A, 13A and corresponding reinforcement rings 22, 23, respectively. The notch portion 26 or slit portion 26 may be fabricated like a rectangular window in the elastic portions 22A, 23A. Also as an alternative way of forming the first elastic portions 22A and the second elastic portions 23A, the notch portion 26 or slit portion 26 may be disposed in either one of the first support portion 22B or the second support portion 23B Furthermore a seal device 1 as the second embodiment related to the present invention provides the following advantages. Disposition of slit portions 26 or notch portions 26 in a first reinforcement ring 22 and a second reinforcement ring 23 enables an optimal design of elastic forces generated by the first reinforcement ring 22 and the second reinforcement ring 23. This in turn provides an optimal, resiliently urging, support at the seal surfaces 4A, 5A of a first seal ring 4 and a second seal ring 5, respectively. In addition the integration of a first resilient body member 12 and a second resilient body member 13, respectively, with the first reinforcement ring 22 and the second reinforcement ring 23 by means of the slit portions 26 or the notch portions 26, not only enhances the bonding strength of the first reinforcement ring 22 and the second reinforcement ring 23 but also is capable of providing a substantial resilient support even for a non-adhesive material in use for the both components.

A seal device 1 as a third embodiment related to the present invention disposes a first reinforcement ring 22 of a first resilient seal ring 2 at the opposite side of the first resilient seal ring 2 with respect to a process fluid and a second reinforcement ring 23 of a second resilient seal ring 3 at the opposite side of the second resilient seal ring 3 with respect to the fluid.

In the seal device 1 as a third embodiment related to the present invention, since the first reinforcement ring 22 and the second reinforcement ring 23 are mounted onto the first resilient seal ring 2 and the second resilient seal ring 3, respectively, at the opposite side relative to the process fluid, it is less likely for inclusions in the fluid to go into between the mating surfaces at the individual contact surfaces, i.e., first seal portions 12B, 13B and second seal portions 12C, 13C, and this prevents the inclusions from causing abrasion of the mating contact surfaces and the individual seal portions 12B, 13B, 12C, 13C. Wear of the seal portions 12B, 13B, 12C, 13C is thus avoided and their seal capability can be exhibited in a satisfactory manner. Also the absence of contact with the fluid effectively prevents the reinforcement rings 22, 23 from capturing rust. Furthermore the individual reinforcement rings 22, 23 are not only capable of providing the resilient seals 12A, 13A with a reinforcement support from the opposite side of the resilient seal rings 2, 3 relative to the fluid, respectively, and but also capable of producing resiliently, urging forces against the individual seal rings 4, 5 in a long term.

In addition a seal device 1 as the third embodiment related to the present invention provides the following advantages. Disposing the first reinforcement ring 22 and the second reinforcement ring 23 within the side wall of the annularly-shaped body of the first resilient body member 12 and the second resilient body member 13, respectively, provides a seal-tight contact at the first seal portions 12B, 13B against the first fixing portion 51A and the second fixing portion 61A, respectively, as well as at the second seal portions 12C, 13C against the first seal ring 4 and the second seal ring 5, respectively. Hence the contact forces at the individual contacting surfaces are enhanced. Furthermore even when slurry particles get into at the interface between the first seal portions 12B, 13B and the mating first fixing portion 51A and the second fixing portion 61A, respectively, and/or at the interface between the second seal portions 12C, 13C and the mating first seal ring 4 and the second seal ring 5, respectively, rubber materials used for the first seal portions 12B, 13B and the second seal portions 12C, 13C effectively prevents the slurry particles from causing wear.

In a seal device 1 as a fourth embodiment related to the present invention, individual second support portions 22C, 23C have a shape of circular-arc or are bent at several points to form a piecewise straight contour and also are embedded in the second seal portions 12C, 13C, respectively.

In the seal device 1 of the fourth embodiment related to the present invention, second support portions 22C, 23C not only are bent in a circular shape or at multiple inflection points but also are embedded inside second seal portions 12C, 13C. The second seal portions 12C, 13C embedding the bent, strong second support portions 22C, 23C therewithin can provide a support such that the seal surfaces 4A, 5A come in a seal-tight contact. This effectively prevents slurry particles from entering the interface formed between the contact surfaces of the second seal portions 12C, 13C and their opposed, mating contact surfaces. It also prevents wear due to slurry particles being present at the interface.

Furthermore the rubber elastic force in the second seal portions 12C, 13C enables a seal-tight contact of the second seal portions 12C, 13C against the second retainer portions 4B, 5B. The seal capability at the interface between the second seal portions 12C, 13C and the second retainer portions 4B, 5B, respectively, is thus improved. Also the second seal portions 12C, 13C are securely fit with the second retainer portions 4B, 5B, respectively, by using a small contact width. It can therefore be used to support seal rings 4, 5 of a small size.

In a seal device 1 as a fifth embodiment related to the present invention, a first reinforcement ring 22 and a second reinforcement ring 23 are disposed toward the fluid side relative to the neutral line along the thickness direction of a first resilient seal ring 2 and relative to the neutral line along the thickness direction of a second resilient seal ring 3, respectively The seal device 1 of the fourth embodiment related to the present invention is particularly effective when the individual seal rings 2, 3 are made large in thickness. It is also effective when first seal portions 12B, 13B and second seal portions 12C, 13C are made in a large size. It is most suitable for such a case that resilient forces of resilient seal portions 12A, 13A and resilient forces of elastic portions 22A, 23A are to be carefully designed. In the seal device 1 thus arranged, the individual reinforcement ring 22, 23 can be made slim relative to the resilient seal portions 12A, 13A. Embedding the reinforcement rings 22, 23 toward the fluid side of the resilient seal portions 12A, 13A not only promotes the elastic deformation on the installation but also prevents slurry from going into the joint surfaces of the individual seal portions 12B, 13B, 12C, 13C by means of the coordination of the reinforcement rings 22, 23 embedded in the fluid side and the rubber resilient material of a large thickness located toward the fluid side relative to the reinforcement rings 22, 23.

Furthermore in the seal device 1 of the fourth embodiment related to the present invention, the individual third support portions 23D of the first reinforcement ring 22 and the second reinforcement ring 23 which are bent in a circularly arc shape or at multiple inflection points not only improve the contact forces against the second seal portions 12C, 13C but also provide a resiliently, urging force in order to urge the seal surfaces 4A, 5A of the first seal ring 4 and the second seal ring 5, respectively, to a seal-tight contact. In addition embedding the first reinforcement ring 22 and the second reinforcement ring 23 toward the oppositely facing direction of the first resilient body member 12 and the second resilient body member 13, respectively, as well as making the resilient body members 12, 13 thick enables the first elastic portion 22A and the second elastic portion 23A to exhibit a resilient support. Also softening the rubber elastic force of the first elastic portion 22A and the second elastic portion 23A effectively prevents the joint surfaces of the first seal portions 12B, 13B and the second seal portions 12C, 13C from being worn by the slurry remaining in the joint surfaces, and accordingly improves the seal capability of the individual joint surfaces of the first seal portions 12B, 13B and the second seal portions 12C, 13C.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A seal device for effecting a seal between relatively rotating one component and the other component, said seal device comprising:
   (a) a first seal ring disposing a first seal surface on one end of said first seal ring and a first retainer portion on the opposite end of said first seal surface;
   (b) a second seal ring disposing a second seal surface at one end of said second seal ring and a second retainer portion on the opposite end of said second seal surface, the second seal surface being in a sealing relation with said first seal surface by opposing there against;

(c) a first resilient seal ring having a first resilient seal portion, a second seal portion and a first seal portion, the first resilient seal portion urging said first seal surface of said first seal ring against said second seal surface of said second seal ring, the second seal portion being located on one end of said first resilient seal portion and mating with said first retainer portion of said first seal ring, the first seal portion being located on the other end of said first resilient seal portion and being in a sealing relation with said one component, said first resilient seal ring being made of a rubber resilient material;

(d) a second resilient seal ring having a second resilient seal portion, a second seal portion and a first seal portion, the second resilient seal portion urging said second seal surface of said second seal ring against said first seal surface of said first seal ring, the second seal portion being located on one end of said second resilient seal portion and mating with said second retainer portion of said second seal ring, the first seal portion being located on the other end of said second resilient seal portion and being in a sealing relation with said other component, said second resilient seal ring being made of a rubber resilient material;

(e) a first reinforcement ring having a first elastic portion, a first support portion and a second support portion, the first elastic portion providing a reinforcement to said first resilient seal portion, the first support portion providing a support to said first seal portion at one end of said first elastic portion, the second support portion providing a support to said second seal portion at the other end of said first elastic portion; and (f) a second reinforcement ring having a second elastic portion, a first support portion and a second support portion, the second elastic portion providing a reinforcement to said second resilient seal portion, the first support portion providing a support to said first seal portion at one end of said second elastic portion, the second support portion providing a support to said second seal portion at the other end of said second elastic portion.

2. A seal device as claimed in claim 1 wherein at least one of the first elastic portion of said first reinforcement ring and the second elastic portion of said second reinforcement ring disposes a plurality of notch portions or slit portions along the length of the elastic portion.

3. A seal device as claimed in claim 1 wherein said first resilient seal ring mounts said first reinforcement ring in a joining manner onto an annularly-shaped side surface, on the opposite side of the fluid, of said first resilient seal ring, and said second resilient seal ring mounts said second reinforcement ring in a joining manner onto an annularly-shaped side surface, on the opposite side of the fluid, of said second resilient seal ring.

4. A seal device as claimed in claim 1 wherein said first support portion and said second support portion are shaped to a circular-arc or multi-bent form, said first support portion is embedded in said second seal portion and said first support portion is embedded in said second seal portion.

5. A seal device as claimed in claim 1 wherein said first reinforcement ring is embedded in said first resilient seal ring toward the fluid side relative to the neutral line along the thickness direction of said first resilient seal ring and said second reinforcement ring is embedded in said second resilient seal ring toward the fluid side relative to the neutral line along the thickness direction of said second resilient seal ring.

6. A seal device as claimed in claim 1 wherein said first and second resilient rings are made of a resilient material.

7. A seal device as claimed in claim 6, wherein said resilient material is rubber.

8. A seal device as claimed in claim 7, wherein said rubber is one of a nitrile rubber, a urethane rubber, a fluoro rubber, and isobutylene-isoprene rubber, and elastic resin.

9. A seal device as claimed in claim 6 wherein said first and second reinforcement rings are made of either a steel plate or a resin, wherein said resin is harder than said resilient material from which said first and second resilient rings are made.

10. A seal device as claimed in claim 1 wherein said first reinforcement ring and said first resilient seal ring are joined together to form an integral part and wherein said second reinforcement ring and said second resilient seal ring are joined together to form another integral part.

* * * * *